Patented Nov. 10, 1931

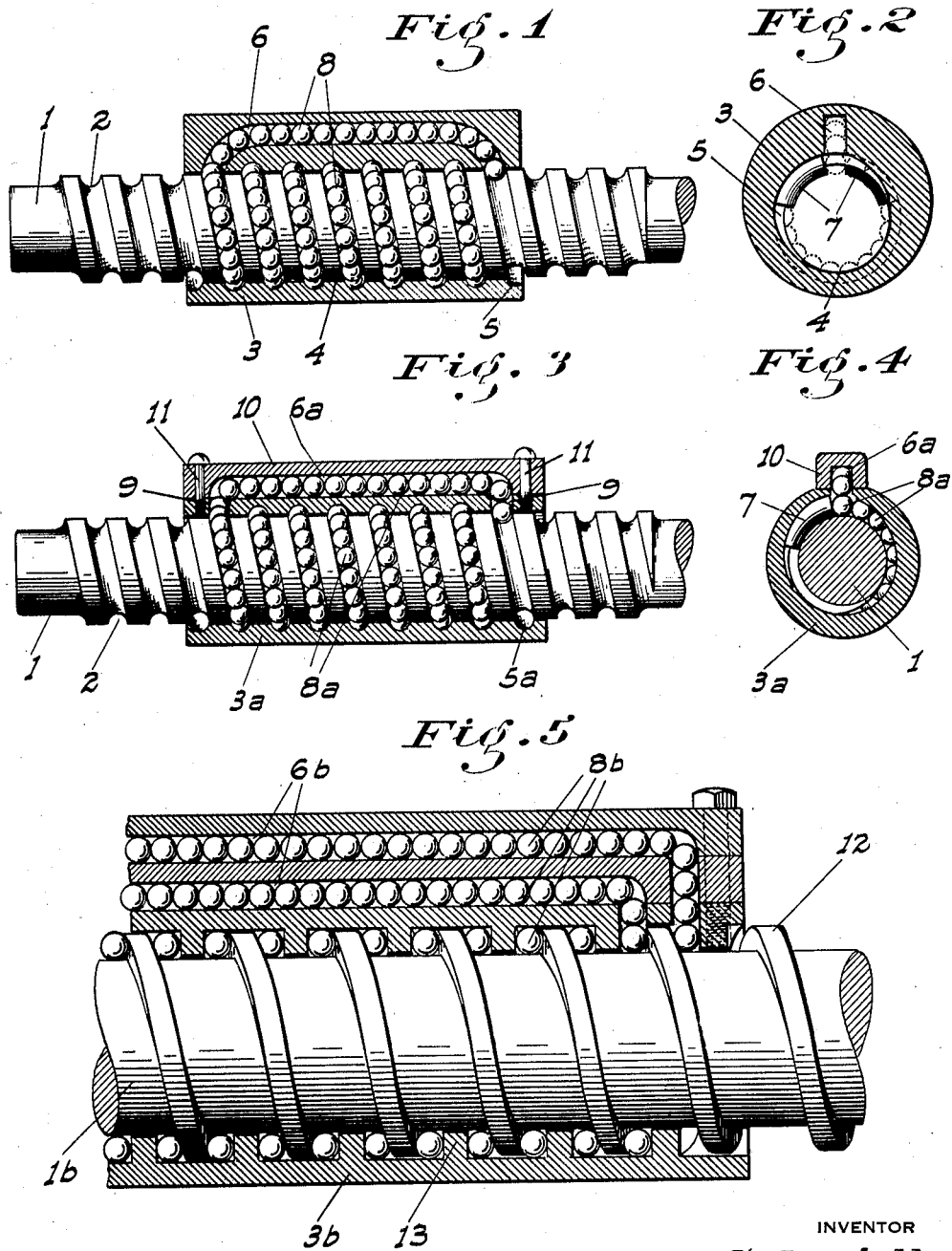

1,831,080

UNITED STATES PATENT OFFICE

BENJAMIN F. SCHMIDT, OF LOS ANGELES, CALIFORNIA

BALL BEARING SCREW AND NUT

Application filed October 22, 1928. Serial No. 313,994.

This invention relates to cooperating screw and nut construction and particularly to such members as are of relatively large size so that they can be used in connection with the steering apparatus of motor vehicles, for which my improved structure is especially intended and adapted.

The principal object of my invention is to provide a structure of this general character so that balls form the actual engaging or load carrying elements between the screw and nut surfaces throughout the length of the latter, instead of the screw threads flatly engaging the cooperating threads in the nut as is ordinarily the case. As a result of this improved construction friction is considerably reduced and there is much less resistance to the relative movement of the parts, promoting ease of operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Fig. 1 is a side elevation of one form of my improved screw and nut, the latter being in section.

Fig. 2 is a cross section of the nut alone taken on the line 2—2 of Fig. 1.

Fig. 3 is a side elevation of a modified form of the structure with the nut in section.

Fig. 4 is a cross section on the line 4—4 of Fig. 3.

Fig. 5 is a fragmentary side view of a further modified form of screw and nut.

Referring now more particularly to the characters of reference on the drawings, and particularly at present to Figs. 1 and 2, the screw shaft 1 is provided with the equivalent of the usual thread of suitable pitch which in this case is preferably in the form of a semi-circular groove 2. The nut 3 surrounds the screw for a portion of the length of the latter and is provided with a main bore 4 to slidably fit over the screw.

Cut inwardly from this bore is a thread groove 5, preferably of semi-circular form and of the same size and pitch as the groove 2 and arranged to register or cooperate therewith in opposed relation thereto.

Projecting lengthwise of the nut and communicating with the nut groove only adjacent the opposite ends thereof is a passage 6, substantially the same width as groove 2 and having a depth equal to that of the grooves 2 and 5 combined. Stop members 7 of suitable form project inwardly from the bore of the nut from the nut groove 5 into the screw groove 2 on opposite sides of the points of communication of the passage 6 therewith. The screw and nut groove between the stops and the passage 6 as well are filled with a row of closely alined balls 8.

By means of this construction it will be seen that if the screw is rotated one way or the other and is held against longitudinal movement the nut will be moved lengthwise of the screw shaft in a corresponding direction; the entire load being taken by the balls with a shearing strain at their points of greatest diameter. With such relative movement between the parts the balls will tend to rotate and travel along the grooves so that they will continually present different portions of their faces to the lines of pressure. The return passage 6 between the ends of the nut groove and the oppositely disposed stops, enables the balls to travel in either direction, depending on the direction of rotation of the shaft, in the form of a continuously unbroken stream, since the stops positively deflect the balls from the groove into and out of one end or the other of the passage.

As the nut is made in one piece as shown in Figs. 1 and 2 it may be somewhat difficult from a manufacturing standpoint to properly form the passage 6 in a smooth manner.

The construction in Figs. 3 and 4 may therefore be adopted instead. In this form of the device the top of the nut 3a is planed off smooth and ball receiving holes 9 are drilled at right angles to said planed surface to communicate with the nut groove 5a adjacent the ends thereof. The ball return passage 6a in this case is formed by cutting a groove the full depth and width of the balls 8a in the bottom of a flat rectangular bar 10; a milling cutter or similar tool being used so that said groove will have rounded ends, and so that the cross sectional area of the groove may be either square as shown, or rounded. This bar is then secured on top of the nut by means of cap screws 11 or the like, so that the groove in the bar is inverted and the top surface of the nut encloses said groove so that the passage 6a is thus formed. The ends of the passage of course register with the holes 9. The construction and operation of this type of device is otherwise the same as described in connection with the type first shown. In the type shown in Fig. 5 the screw shaft 1b has a thread or spiral ledge 12 of substantially square cross section projecting outwardly therefrom, the depth of the threads approximating the diameter of the balls 8b, and the width between adjacent faces of adjacent turns of the thread approximating the width of three balls placed in close longitudinally alined relation.

The nut 3b has a thread or spiral ledge 13 also substantially square in cross section, which projects inwardly of the nut thread and approaches the plane of the periphery of the shaft at the base of its thread. The thread 13 is disposed intermediate adjacent turns of the thread 12 and its width is such that a pair of rows of the balls 8b may be placed against adjacent faces of adjacent turns of the screw thread, with the thread 13 therebetween as a means to separate the rows and to form the necessary thrust or load carrying element between the parts.

With this form of structure a pair of separated return passages 6b for the separate rows of balls is of course necessary.

This type of structure I believe is more suitable for heavy duty work than the first described types, not only on account of the greater number of balls employed but on account of the fact that the positioning of the screw and nut threads relative to each other and to the balls is such that the latter are placed under a crushing instead of a shearing strain, and a ball of a given diameter is of course able to withstand a crushing strain much better than a shearing strain of the same extent.

As is well known, screws having a fast lead are frequently provided with a plurality of threads. Similarly, the screws of the different types herein shown may have a plurality of thread grooves or threads, each with its row of balls, and a return or transfer passage for each row.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

In a ball bearing screw and nut device, a screw shaft having a spiral thread, a nut about the shaft having a thread member to project between adjacent turns of the shaft thread in spaced relation thereto, separate rows of balls about the shaft disposed in the spaces between adjacent turns of the shaft and nut threads, there being separate pairs of intake and outlet passages for the rows of balls leading from the opposite ends of the space occupied thereby to the outer periphery of the nut on the same side thereof, a removable bar secured on and extending lengthwise of the nut over all said passages, said bar being provided with a groove along i s nut engaging face to form, with said face, a ball-passage communicating with the adjacent pair of intake and outlet passages and having other passages leading to its outer periphery from the other pair of intake and outlet passages, and another removable bar superimposed on said first named bar and provided with a groove along its inner face forming, with the outer face of the first named bar, a ball-passage communicating with said other passages in the first named bar.

In testimony whereof I affix my signature.
BENJAMIN F. SCHMIDT.